(12) United States Patent
Zhang (10) Patent No.: US 11,941,503 B2
(45) Date of Patent: Mar. 26, 2024

(54) PERFORMING INFERENCE USING AN ADAPTIVE, HYBRID LOCAL/REMOTE TECHNIQUE

(71) Applicant: EchoNous, Inc., Redmond, WA (US)

(72) Inventor: Fan Zhang, Bellevue, WA (US)

(73) Assignee: EchoNous, Inc., Redmond, WA (US)

( * ) Notice: Subject to any disclaimer, the term of this patent is extended or adjusted under 35 U.S.C. 154(b) by 800 days.

(21) Appl. No.: 17/095,480

(22) Filed: Nov. 11, 2020

(65) Prior Publication Data

US 2022/0147880 A1    May 12, 2022

(51) Int. Cl.
| | |
|---|---|
| *G06K 9/00* | (2022.01) |
| *G06F 18/20* | (2023.01) |
| *G06N 5/04* | (2023.01) |
| *G06N 20/20* | (2019.01) |
| *G06T 7/00* | (2017.01) |
| *G06V 30/24* | (2022.01) |

(52) U.S. Cl.
CPC ........... *G06N 20/20* (2019.01); *G06F 18/285* (2023.01); *G06N 5/04* (2013.01); *G06T 7/0012* (2013.01); *G06V 30/248* (2022.01); *G06T 2207/10021* (2013.01); *G06T 2207/10132* (2013.01); *G06V 30/2528* (2022.01)

(58) Field of Classification Search
CPC ........ G06N 20/20; G06N 5/04; G06F 18/285; G06T 7/0012; G06T 2207/10021; G06T 2207/10132; G06V 30/248; G06V 30/2528; G06V 2201/03; G06V 10/26; G06V 10/143

See application file for complete search history.

(56) References Cited

U.S. PATENT DOCUMENTS

| | | | |
|---|---|---|---|
| 10,536,351 B2 * | 1/2020 | Nagaraju | H04L 43/028 |
| 10,790,056 B1 * | 9/2020 | Accomazzi | H04L 67/1095 |
| 11,701,771 B2 * | 7/2023 | Mousavian | G06N 3/063 |
| | | | 700/245 |
| 2008/0066066 A1 | 3/2008 | MacPherson | |
| 2008/0177683 A1 | 7/2008 | No et al. | |
| 2015/0242760 A1 * | 8/2015 | Miao | G06N 20/00 |
| | | | 706/12 |

(Continued)

OTHER PUBLICATIONS

Written Opinion and International Search Report for PCT/US2021/058833, dated Apr. 22, 1 2022 (10 pages).

(Continued)

*Primary Examiner* — Shervin K Nakhjavan
(74) *Attorney, Agent, or Firm* — Seed Intellectual Property Law Group LLP (57) ABSTRACT

A hybrid inference facility receives a sequence of data items. For each data item, the facility: forwards the data item to a server; subjects it to a local machine learning model to produce a local inference result for the data item; and the local inference result to a queue; aggregates the inference results contained by the queue to obtain an output inference result; and removes the oldest inference result from the queue. The facility receives from the server cloud inference results each obtained by applying a server machine learning model to one of the data items forwarded to the server. For each received cloud inference result, the facility substitutes the cloud inference result in the queue for the local inference result for the same data item.

30 Claims, 10 Drawing Sheets

(56) References Cited

U.S. PATENT DOCUMENTS

2018/0032915 A1\* 2/2018 Nagaraju ............... G06V 10/95
2018/0034715 A1 2/2018 Nagaraju et al.
2019/0303799 A1 10/2019 Gottin et al.
2020/0210754 A1 7/2020 Lin et al.
2021/0259666 A1\* 8/2021 Brenner ............... A61B 8/0883
2021/0345993 A1\* 11/2021 Dickie ................. A61B 8/0825
2023/0117915 A1\* 4/2023 Nouri ..................... G16H 50/30
600/437

OTHER PUBLICATIONS

Lakshminarayanan, B. et al.; "Simple and Scalable Predictive Uncertainty Estimation using Deep Ensembles"; *31$^{st}$ Conference on Neural Information Processing Systems (NIPS)*; 2017 California, USA; retrieved Dec. 10, 2020; 12 pages.

\* cited by examiner

PERFORMING INFERENCE USING AN ADAPTIVE, HYBRID LOCAL/REMOTE TECHNIQUE

BACKGROUND

In machine learning and other forms of artificial intelligence, a model can be trained to make a particular kind of inference from input data. For example, a machine learning model can be trained to make inferences about which anatomical structures are shown in different frames of a medical imaging video sequence.

In some cases, an ensemble of heterogeneous models are trained to make the same inference on the same input data. For each input, all of the models of the ensemble are applied to the input to produce their own inference result. These individual inference results are aggregated, such as by averaging them, to obtain the ensemble's final inference result for the input data.

Models are sometimes applied to input data on a device that generates the input data. In other cases, models are applied to input data on a server that is remote from the device that generates the input data.

DETAILED DESCRIPTION

The inventors have recognized that conventional approaches to performing inference for artificial intelligence applications have significant disadvantages. Where inference is performed locally, it may not be possible to outfit the local device with adequate processing power to effectively perform the inference on its own. For example, the designer of the application may not be able to control the type or processing power level of the local devices on which the application runs, or it may be cost-prohibitive to outfit the local devices with adequate processing power. This can lead to a "dumbing-down" of local inference, reducing model complexity in order to reduce processing requirements, to a point where inference results are of low quality, at which they are not consistently helpful. Where inference is performed on a remote server, transmission time and transmission latency for sending the input data to the server and receiving the inference results from the server may be significant, sometimes variably so.

The inventors have also recognized that these disadvantages are compounded for real-time applications that operate continuously on time-series input data, which can be significantly less helpful to their users at any but the shortest total latency levels, such as 1 second, or even shorter. For local inference, this upper limit on latency makes it even more difficult to timely complete the inference task using reasonable local device processing hardware configurations. For remote inference, round-trip data transmission time can consume much or all of the application's latency budget.

In response to recognizing these disadvantages, the inventors have conceived and reduced to practice a software and/or hardware facility that performs inference using an adaptive, hybrid local/remote technique ("the facility"). In some embodiments, a data item generated on a local device is distributed to inference engines on both the local device and one or servers remote from the local device, such as cloud servers. The inference engine on the local device produces a local inference result, which is propagated into a buffer. The buffer contains inference results for a certain number of the most recently-generated data items, which are aggregated as a basis for smoothing the inference results outputted by the facility for use by the application. The inference engine on the server generates its own result for the data item; this server inference result, or "cloud inference result" is returned to the local device, where the facility replaces the corresponding local inference result in the buffer with the cloud inference result. As a result, the buffer from which the facility produces the inference results it outputs can at any moment contain local inference results for some data items (typically the most recently-generated ones), and cloud inference results for others (typically the least recently-generated ones).

The facility's operating scheme is hybrid, in the sense that it takes advantage of both local and remote inference. It is adaptive, in the sense that, at times when server processing speed is high and server network latency is low, the buffer can contain a relatively large number of cloud inference results, and thus the cloud inference results can have a large impact on inference results outputted by the facility; at other times, when server processing speed is low and/or server network latency is high, the buffer can contain fewer cloud inference results, and thus local inference results have a larger impact on outputted inference results.

In various embodiments, the local and cloud inference processes employed by the facility differ from one another in a variety of ways. In some embodiments, the facility uses as the local inference process the cloud inference process, adapted in ways that reduce its processing burden. For example, in some embodiments, some of the models of an ensemble used by the cloud inference engine are removed for the ensemble's use by the local inference engine. In some embodiments, some or all of the models of an ensemble used by the cloud inference engine are simplified to reduce the number of operations needed to evaluate them.

In some embodiments, the local inference engine limits the number of models of an ensemble that it applies to each data item, such as limiting to one the number of models applied to each data item, and rotating among the models for different data items. This is sometimes referred to herein as the "pseudo-ensemble approach;" it enables the inference engine is able to increase the diversity of predictions in the buffer (because each successive prediction is generated by a different sub-model), thus increase the robustness of the output when aggregating them together. This technique mimics the advantage of traditional ensemble while incurring a lower computational cost.

In some embodiments, the facility adapts the input data for local inference and/or for cloud inference. For example, in some embodiments, the facility reduces the precision, resolution, and/or dimensionality of the input data before sending it to the server, such as in cases where network latency is high, network speed is low, or server processing load is high. On the other hand, in some embodiments, the facility reduces the precision, resolution, and/or dimensionality of the input data for processing in the local device, such as in cases where the local device has low processing power and/or a high ambient processing load.

By performing in some or all of these ways, the facility uses both local and server processing capabilities to produce high-quality inference results with low application latency.

Additionally, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by sharing the inference processing load with a server, the facility can reduce the inference processing load on the local device, permitting it to be outfitted with a less powerful and less expensive processor, or permitting it to undertake more or larger simultaneous processing tasks.

Figure 1:
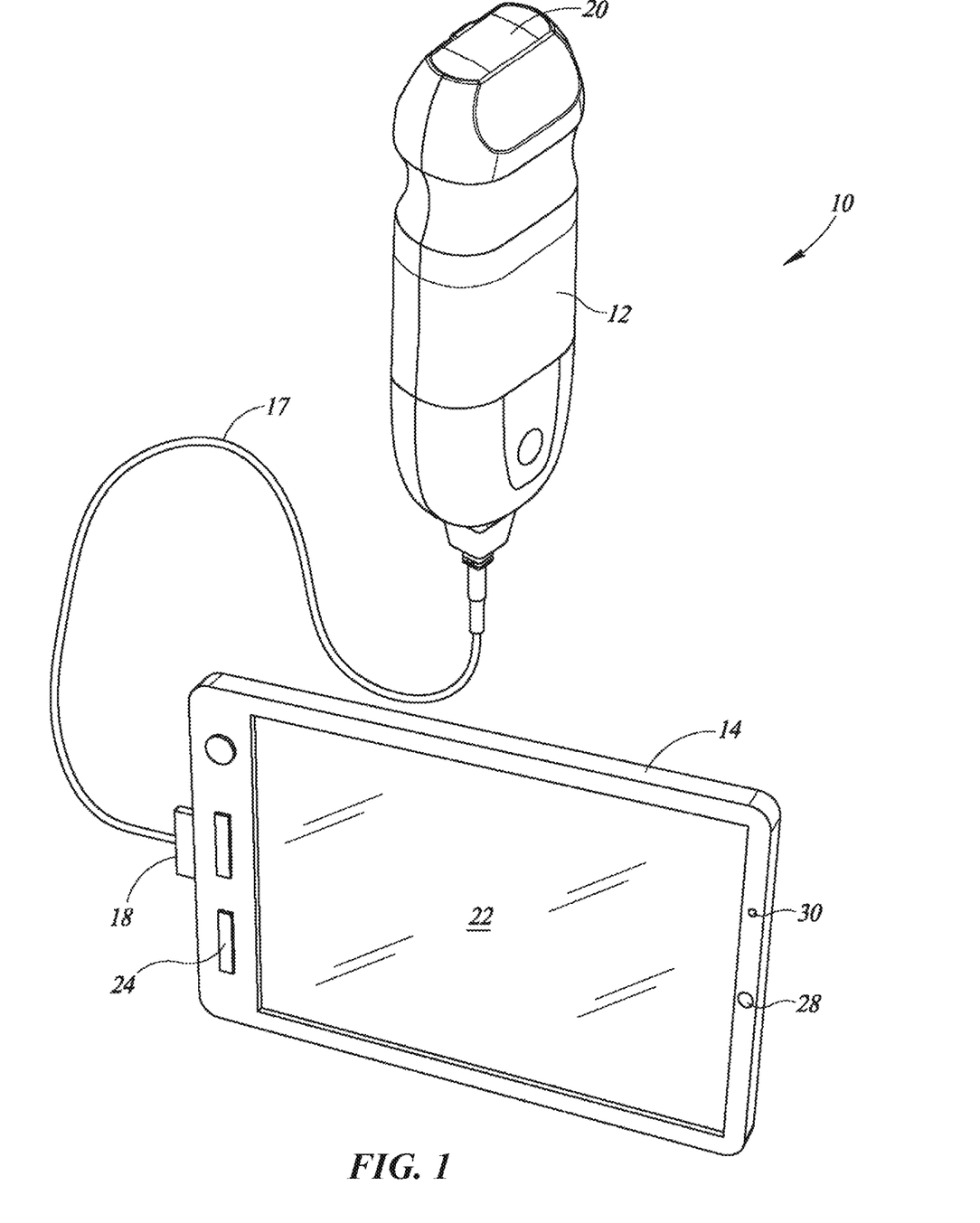
FIG. 1 is a schematic illustration of a physiological sensing device in accordance with one or more embodiments of the present disclosure.

FIG. 1 is a schematic illustration of a physiological sensing device in accordance with one or more embodiments of the present disclosure. The device 10 includes a probe 12 that, in the illustrated embodiment, is electrically coupled to a handheld computing device 14 by a cable 17. The cable 17 includes a connector 18 that detachably connects the probe 12 to the computing device 14. The handheld computing device 14 may be any portable computing device having a display, such as a tablet computer, a smartphone, or the like. In some embodiments, the probe 12 need not be electrically coupled to the handheld computing device 14, but may operate independently of the handheld computing device 14, and the probe 12 may communicate with the handheld computing device 14 via a wireless communication channel.

The probe 12 is configured to transmit an ultrasound signal toward a target structure and to receive echo signals returning from the target structure in response to transmission of the ultrasound signal. The probe 12 includes an ultrasound sensor 20 that, in various embodiments, may include an array of transducer elements (e.g., a transducer array) capable of transmitting an ultrasound signal and receiving subsequent echo signals.

The device 10 further includes processing circuitry and driving circuitry. In part, the processing circuitry controls the transmission of the ultrasound signal from the ultrasound sensor 20. The driving circuitry is operatively coupled to the ultrasound sensor 20 for driving the transmission of the ultrasound signal, e.g., in response to a control signal received from the processing circuitry. The driving circuitry and processor circuitry may be included in one or both of the probe 12 and the handheld computing device 14. The device 10 also includes a power supply that provides power to the driving circuitry for transmission of the ultrasound signal, for example, in a pulsed wave or a continuous wave mode of operation.

The ultrasound sensor 20 of the probe 12 may include one or more transmit transducer elements that transmit the ultrasound signal and one or more receive transducer elements that receive echo signals returning from a target structure in response to transmission of the ultrasound signal. In some embodiments, some or all of the transducer elements of the ultrasound sensor 20 may act as transmit transducer elements during a first period of time and as receive transducer elements during a second period of time that is different than the first period of time (i.e., the same transducer elements may be usable to transmit the ultrasound signal and to receive echo signals at different times).

The computing device 14 shown in FIG. 1 includes a display screen 22 and a user interface 24. The display screen 22 may be a display incorporating any type of display technology including, but not limited to, LCD or LED display technology. The display screen 22 is used to display one or more images generated from echo data obtained from the echo signals received in response to transmission of an ultrasound signal, and in some embodiments, the display screen 22 may be used to display color flow image information, for example, as may be provided in a Color Doppler imaging (CDI) mode. Moreover, in some embodiments, the display screen 22 may be used to display audio waveforms, such as waveforms representative of an acquired or conditioned auscultation signal.

In some embodiments, the display screen 22 may be a touch screen capable of receiving input from a user that touches the screen. In such embodiments, the user interface 24 may include a portion or the entire display screen 22, which is capable of receiving user input via touch. In some embodiments, the user interface 24 may include one or more buttons, knobs, switches, and the like, capable of receiving input from a user of the ultrasound device 10. In some embodiments, the user interface 24 may include a microphone 30 capable of receiving audible input, such as voice commands.

The computing device 14 may further include one or more audio speakers 28 that may be used to output acquired or conditioned auscultation signals, or audible representations of echo signals, blood flow during Doppler ultrasound imaging, or other features derived from operation of the device 10.

The probe 12 includes a housing, which forms an external portion of the probe 12. The housing includes a sensor portion located near a distal end of the housing, and a handle portion located between a proximal end and the distal end of the housing. The handle portion is proximally located with respect to the sensor portion.

The handle portion is a portion of the housing that is gripped by a user to hold, control, and manipulate the probe 12 during use. The handle portion may include gripping features, such as one or more detents, and in some embodiments, the handle portion may have a same general shape as portions of the housing that are distal to, or proximal to, the handle portion.

The housing surrounds internal electronic components and/or circuitry of the probe 12, including, for example, electronics such as driving circuitry, processing circuitry, oscillators, beamforming circuitry, filtering circuitry, and the like. The housing may be formed to surround or at least partially surround externally located portions of the probe 12, such as a sensing surface. The housing may be a sealed housing, such that moisture, liquid or other fluids are prevented from entering the housing. The housing may be formed of any suitable materials, and in some embodiments, the housing is formed of a plastic material. The housing may be formed of a single piece (e.g., a single material that is molded surrounding the internal components) or may be formed of two or more pieces (e.g., upper and lower halves) which are bonded or otherwise attached to one another.

In some embodiments, the probe 12 includes a motion sensor. The motion sensor is operable to sense a motion of the probe 12. The motion sensor is included in or on the probe 12 and may include, for example, one or more accelerometers, magnetometers, or gyroscopes for sensing motion of the probe 12. For example, the motion sensor may be or include any of a piezoelectric, piezoresistive, or capacitive accelerometer capable of sensing motion of the probe 12. In some embodiments, the motion sensor is a tri-axial motion sensor capable of sensing motion about any of three axes. In some embodiments, more than one motion sensor 16 is included in or on the probe 12. In some embodiments, the motion sensor includes at least one accelerometer and at least one gyroscope.

The motion sensor may be housed at least partially within the housing of the probe 12. In some embodiments, the motion sensor is positioned at or near the sensing surface of the probe 12. In some embodiments, the sensing surface is a surface which is operably brought into contact with a patient during an examination, such as for ultrasound imaging or auscultation sensing. The ultrasound sensor 20 and one or more auscultation sensors are positioned on, at, or near the sensing surface.

In some embodiments, the transducer array of the ultrasound sensor 20 is a one-dimensional (1D) array or a two-dimensional (2D) array of transducer elements. The transducer array may include piezoelectric ceramics, such as lead zirconate titanate (PZT), or may be based on microelectromechanical systems (MEMS). For example, in various embodiments, the ultrasound sensor 20 may include piezoelectric micromachined ultrasonic transducers (PMUT), which are microelectromechanical systems (MEMS)-based piezoelectric ultrasonic transducers, or the ultrasound sensor 20 may include capacitive micromachined ultrasound transducers (CMUT) in which the energy transduction is provided due to a change in capacitance.

The ultrasound sensor 20 may further include an ultrasound focusing lens, which may be positioned over the transducer array, and which may form a part of the sensing surface. The focusing lens may be any lens operable to focus a transmitted ultrasound beam from the transducer array toward a patient and/or to focus a reflected ultrasound beam from the patient to the transducer array. The ultrasound focusing lens may have a curved surface shape in some embodiments. The ultrasound focusing lens may have different shapes, depending on a desired application, e.g., a desired operating frequency, or the like. The ultrasound focusing lens may be formed of any suitable material, and in some embodiments, the ultrasound focusing lens is formed of a room-temperature-vulcanizing (RTV) rubber material.

In some embodiments, first and second membranes are positioned adjacent to opposite sides of the ultrasound sensor 20 and form a part of the sensing surface. The membranes may be formed of any suitable material, and in some embodiments, the membranes are formed of a room-temperature-vulcanizing (RTV) rubber material. In some embodiments, the membranes are formed of a same material as the ultrasound focusing lens.

Figure 2:
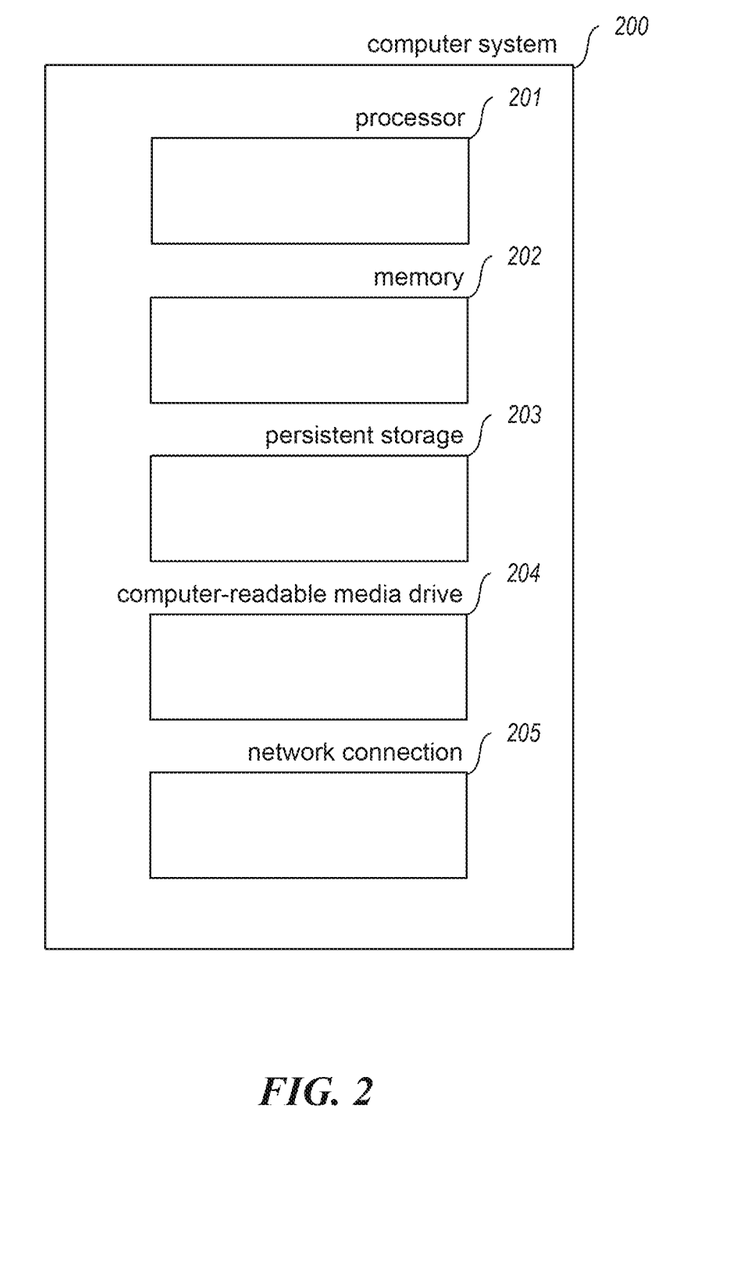
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, physiological sensing devices, and/or their associated display devices, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3:
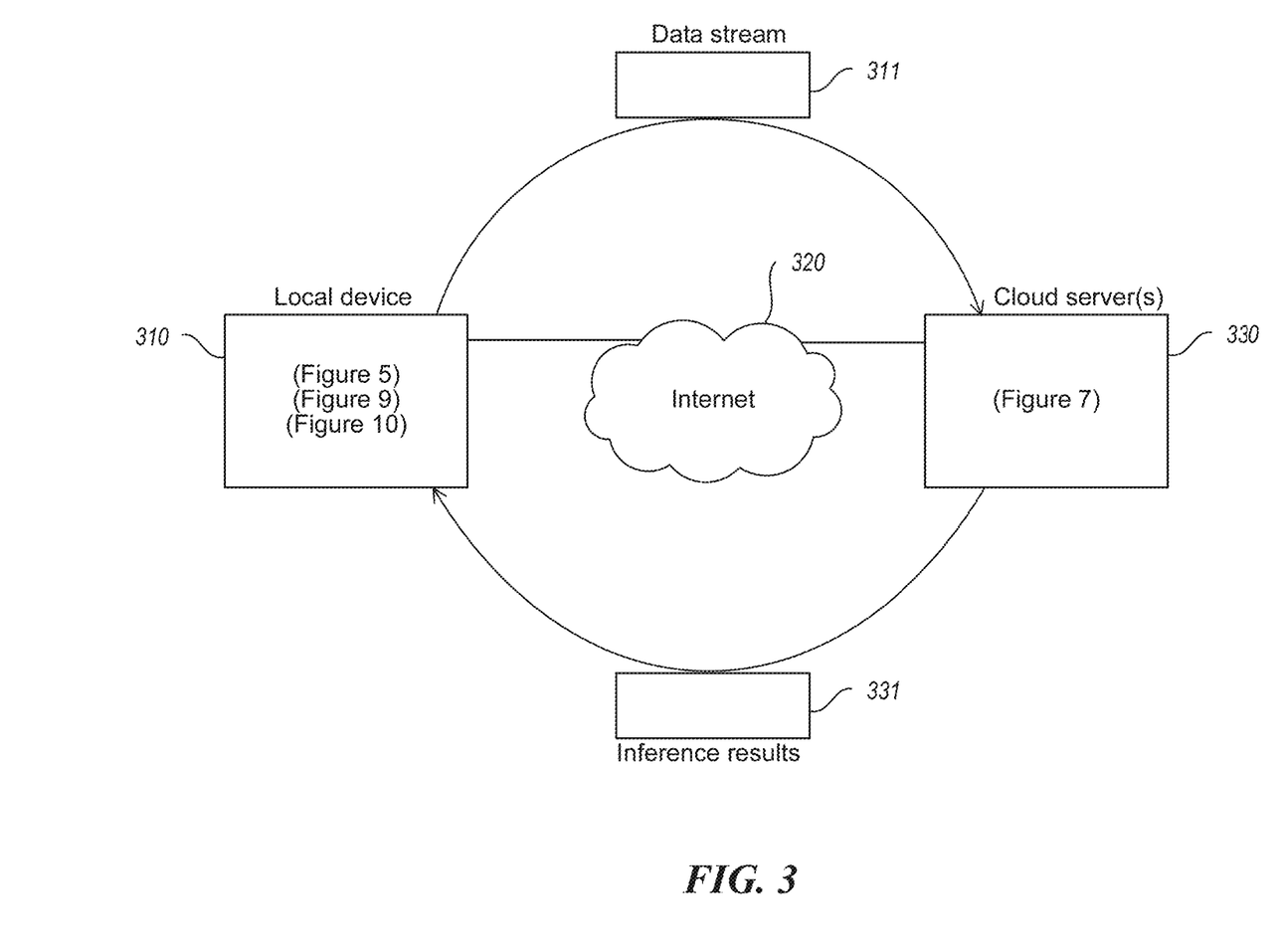
FIG. 3 is a data flow diagram illustrating the overall operation of the facility in some embodiments.

FIG. 3 is a data flow diagram illustrating the overall operation of the facility in some embodiments. A local device 310 is connected by the Internet or another network 320 to one or more cloud servers 330. In various embodiments, the local device is of a variety of device types; these can include, for example, handheld or freestanding ultrasound imaging systems; medical imaging systems of other types; specialized or general-purpose devices for collecting various other types of data, including audio data, video data, temperature data, pressure data, user input signals, traffic data, air quality data, performance data for a manufacturing machine, automobile or other vehicle, or machines of other types, etc. The cloud servers may be of a variety of types, including public cloud servers, private cloud servers, customer-owned cloud servers, etc., using various types of virtualization software, or not using any virtualization software.

Figure 7:
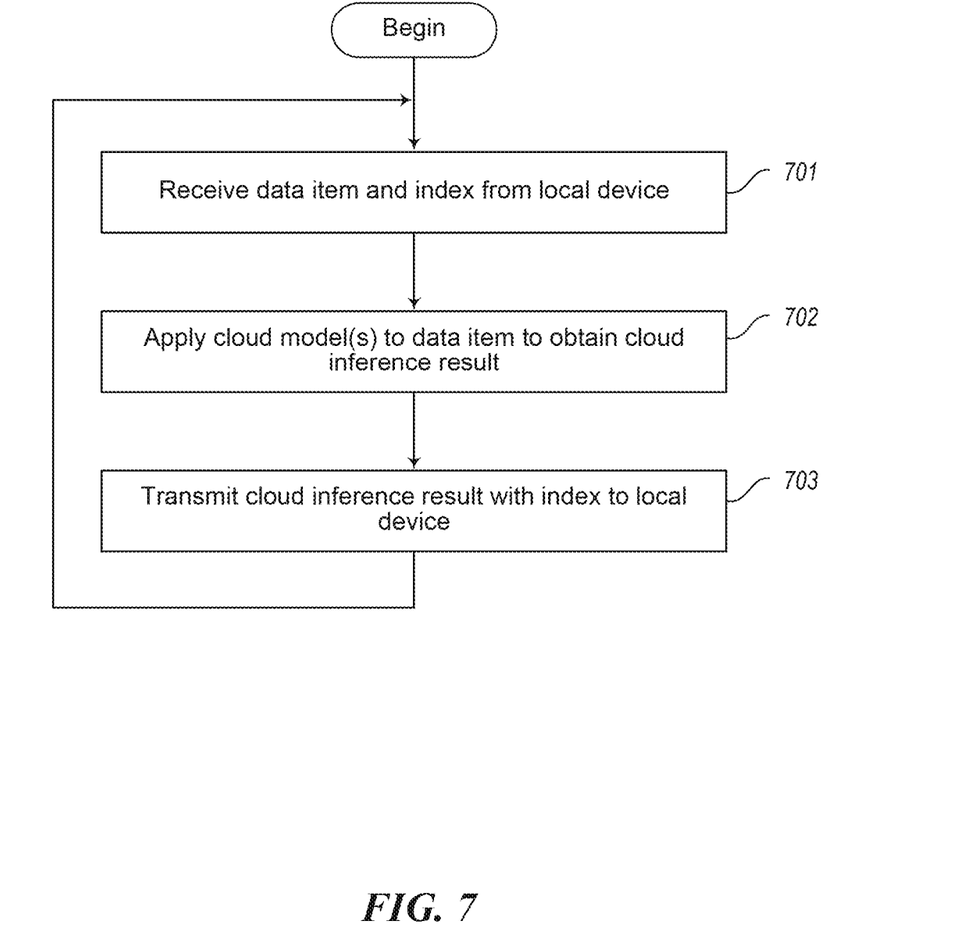
FIG. 7 is a flow diagram showing a process performed by the facility in a cloud server in some embodiments to perform cloud inference.
Figure 9:
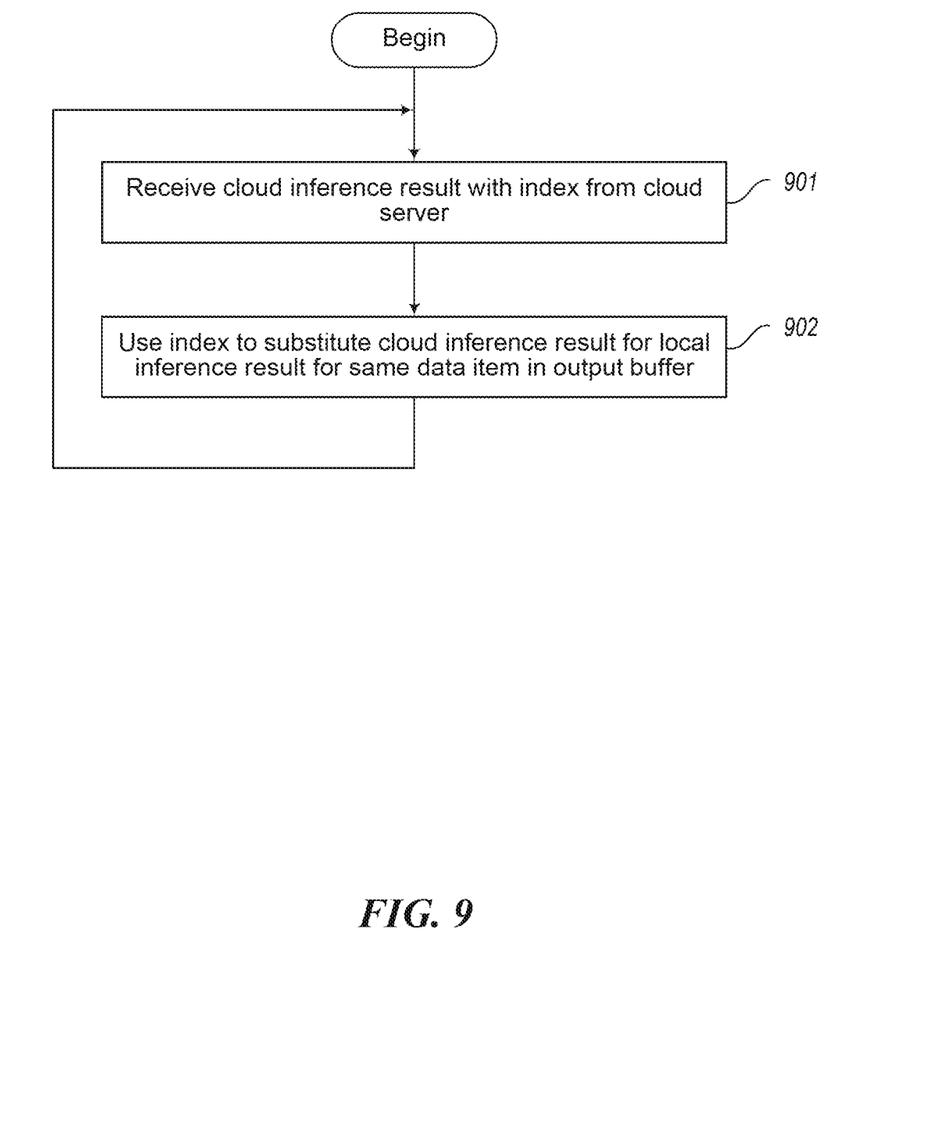
FIG. 9 is a flow diagram showing a process performed by the facility in some embodiments to receive cloud inference results and add them to the facility's output queue.
Figure 10:
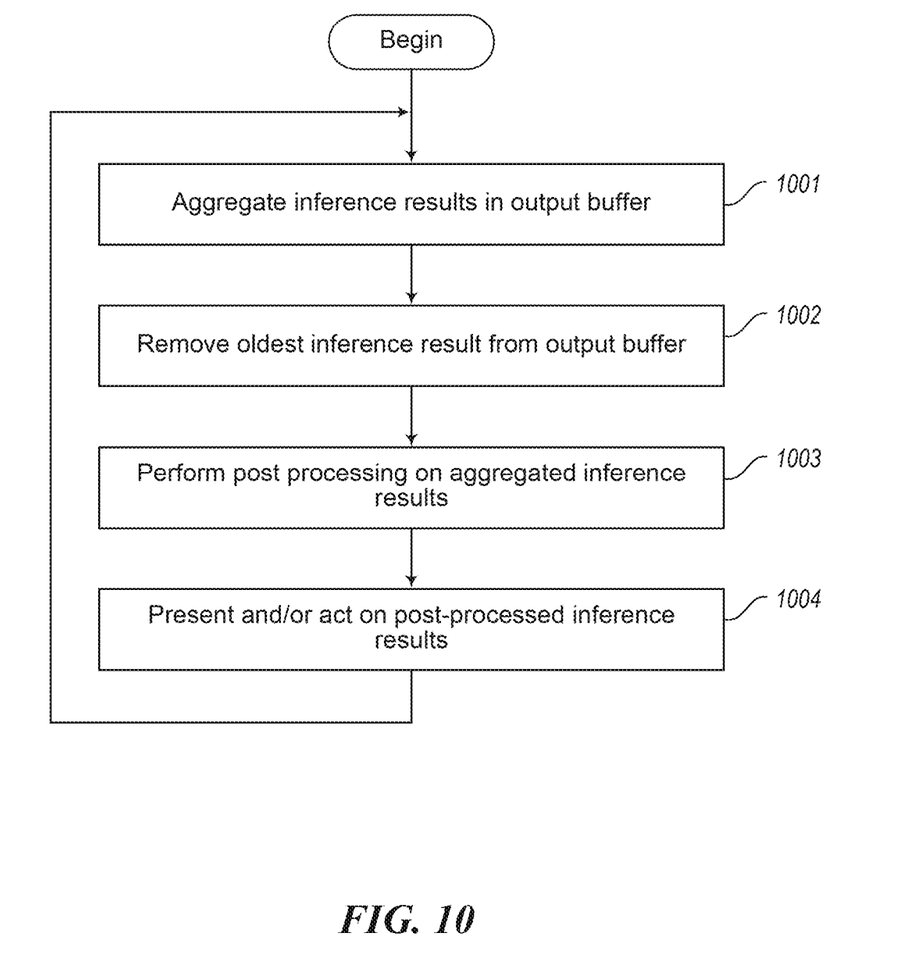
FIG. 10 is a flow diagram showing a process performed by the facility in some embodiments to generate inference output based upon the contents of the facility's output buffer.

The local device receives data items, such as a sequence of ultrasound images, as they are generated; as described further below in connection with FIG. 5, it dispatches these in a data stream 311 to the cloud server, performs local inference on it, and populates the local inference result queue of inference results. FIG. 7 discussed below shows how the cloud server receives data items in the data stream; performs cloud inference on these; and returns the cloud inference results 331 it produces to the local device. FIG. 9, discussed below, shows the local device receiving the cloud inference results, and substituting each in the inference result queue for the local inference result produced by the local device for the same data item. FIG. 10, discussed below, shows the local device generating inference results for output by aggregating the inference results in the queue, which can include both inference results produced on the local device and inference results produced by the cloud servers.

Figure 4:
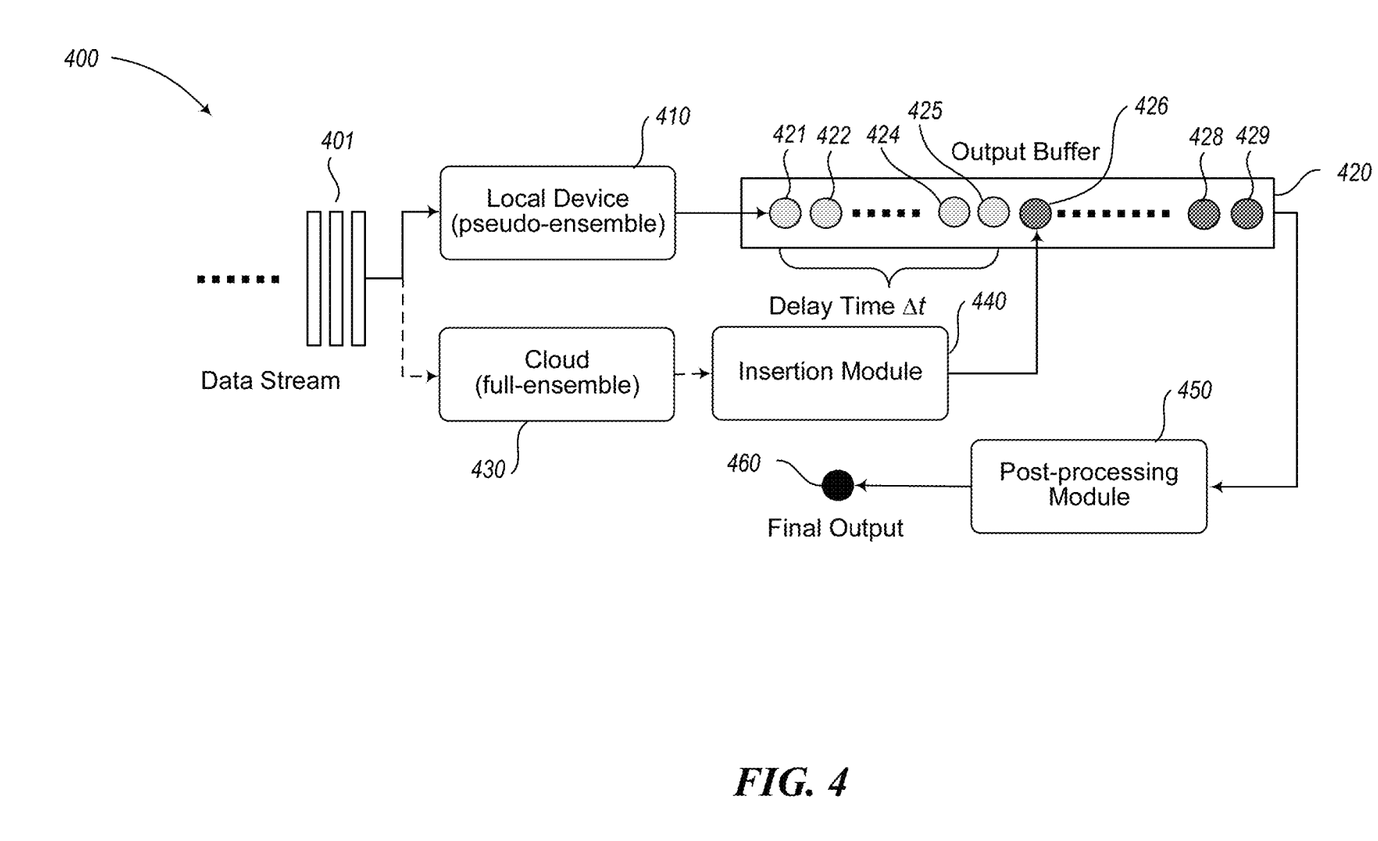
FIG. 4 is a data flow diagram showing additional details on the facility's operation in some embodiments.

FIG. 4 is a data flow diagram showing additional details on the facility's operation in some embodiments. The data flow 400 shows the production over time of a data stream 401 made up of individual data items shown as rectangles. The facility distributes each data item for local inference 410 on the local device, and for cloud inference 430 on the cloud server. As noted, in some embodiments, the machine learning models used to perform local inference and cloud inference are different; in some cases, the model used for cloud inference is more robust than the model used for local inference, producing a higher-quality result at a greater processing resource cost.

As each local inference result is produced, the facility adds it to output buffer 420. For example, the lighter-shaded inference results 421-425 are each a local inference result that has been added to the buffer based on one of the last several data items. As inference results are received from the cloud server, the facility in an insertion model 440 substitutes each cloud inference result in the buffer for the local inference result produced locally for the same data item. For example, it can be seen that the insertion module is in the process of replacing a local inference result for a particular item with the cloud inference result 426 for the same item. Additionally, the buffer includes a number of other cloud inference results 428 and 429 that the facility has substituted for local inference results originally placed in the buffer for the same data items. In some embodiments, the output buffer has a fixed size, such as five, ten, twenty, thirty, etc., inference results, and the addition of a new local inference result displaces the oldest inference result of either type. It can be seen that the number of local inference results 421-425 in the buffer at a given time corresponds to a delay time Δt, which roughly represents the difference between (1) the amount of time after a data item is originated that a cloud inference result is received for the data item in the local device, (2) the amount of time after a data item is originated that the local inference result for the data item is produced on the local device.

Periodically, such as each time a local inference result is added to the output buffer, displacing the oldest inference result formerly contained by the output buffer, the facility aggregates inference results in the output buffer to perform smoothing on its output, or/and calculates a quantitative measurement from the inference results in the buffer, such as object trajectory, velocity, acceleration, model uncertainty, etc. In various embodiments, the facility uses a variety of aggregation functions to perform this aggregation, such as mean, median, mode, minimum, maximum, etc. The facility subjects the inference results aggregated from the buffer to certain post-processing in post-processing module 450. Depending on the nature of the input data, this post-processing can take a variety of forms. As one example, where segmentation of anatomical structures in a medical image is being performed by the facility as the inference, post-processing in some embodiments involves annotating these segmentation results on an original version of the image for display; filling voids in the predicted segmentation results, etc. The facility produces final output 460 as the result of this post-processing. In various embodiments, the facility displays the final output, stores the final output, transmits the final output to one or more other devices, makes a further decision or determination on the basis of the final output, etc.

Figure 5:
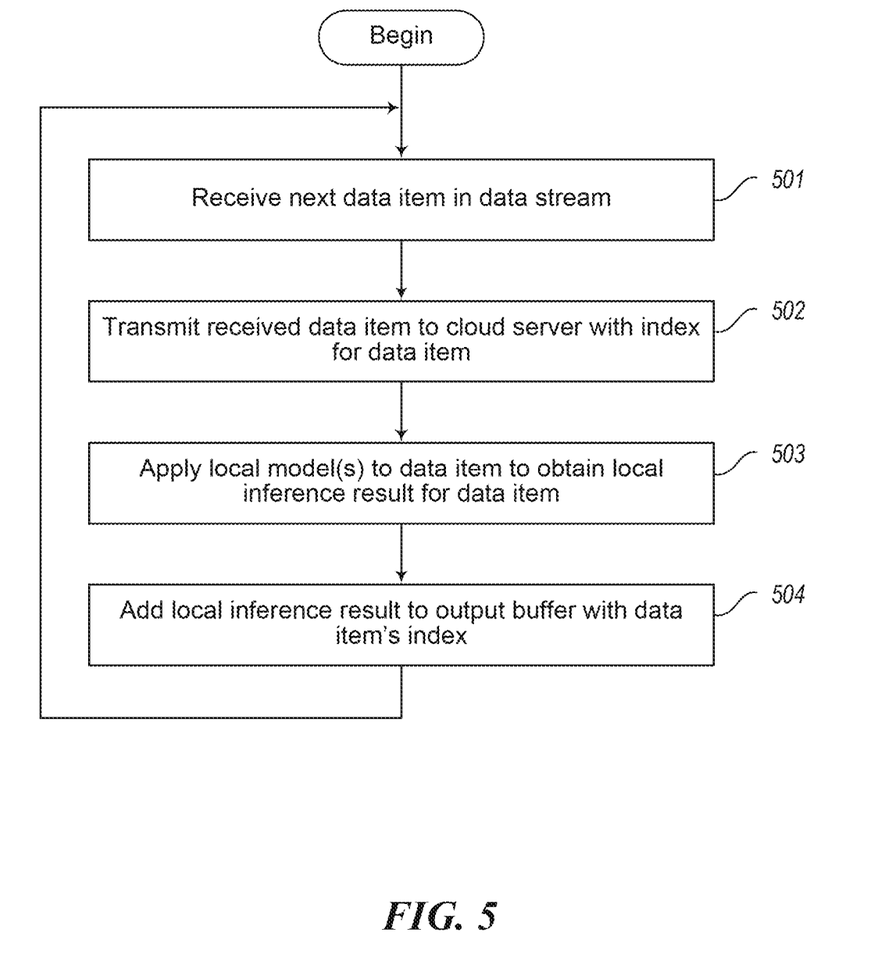
FIG. 5 is a flow diagram showing a process performed by the facility in some embodiments to manage local inference and dispatch new data items to the cloud server.

FIG. 5 is a flow diagram showing a process performed by the facility in some embodiments to manage local inference and dispatch new data items to the cloud server. In various embodiments, the received data item is generated in the local device without the use of sensors; generated in the local device on the basis of sensors connected directly to the local device; generated on a device other than the local device and transmitted to or retrieved by the local device; etc.

In act 502, the facility transmits the data item received in act 501 to a cloud server, together with an index identifying the data item. In various embodiments, the index indicates a time or sequence number at which the data item was generated; an identifier arbitrarily assigned to each data item; etc.

In act 503, the facility applies local models to the data item to obtain local inference result for the data item. Act 503 is discussed in greater detail below in connection with FIG. 6.

In act 504, the facility adds the local inference result produced in act 503 to the output buffer, along with the index for the data item. After act 504, the facility continues in act 501 to receive the next data item.

Those skilled in the art will appreciate that the acts shown in FIG. 5 and in each of the flow diagrams discussed below may be altered in a variety of ways. For example, the order of the acts may be rearranged; some acts may be performed in parallel; shown acts may be omitted, or other acts may be included; a shown act may be divided into sub-acts, or multiple shown acts may be combined into a single act, etc.

Figure 6:
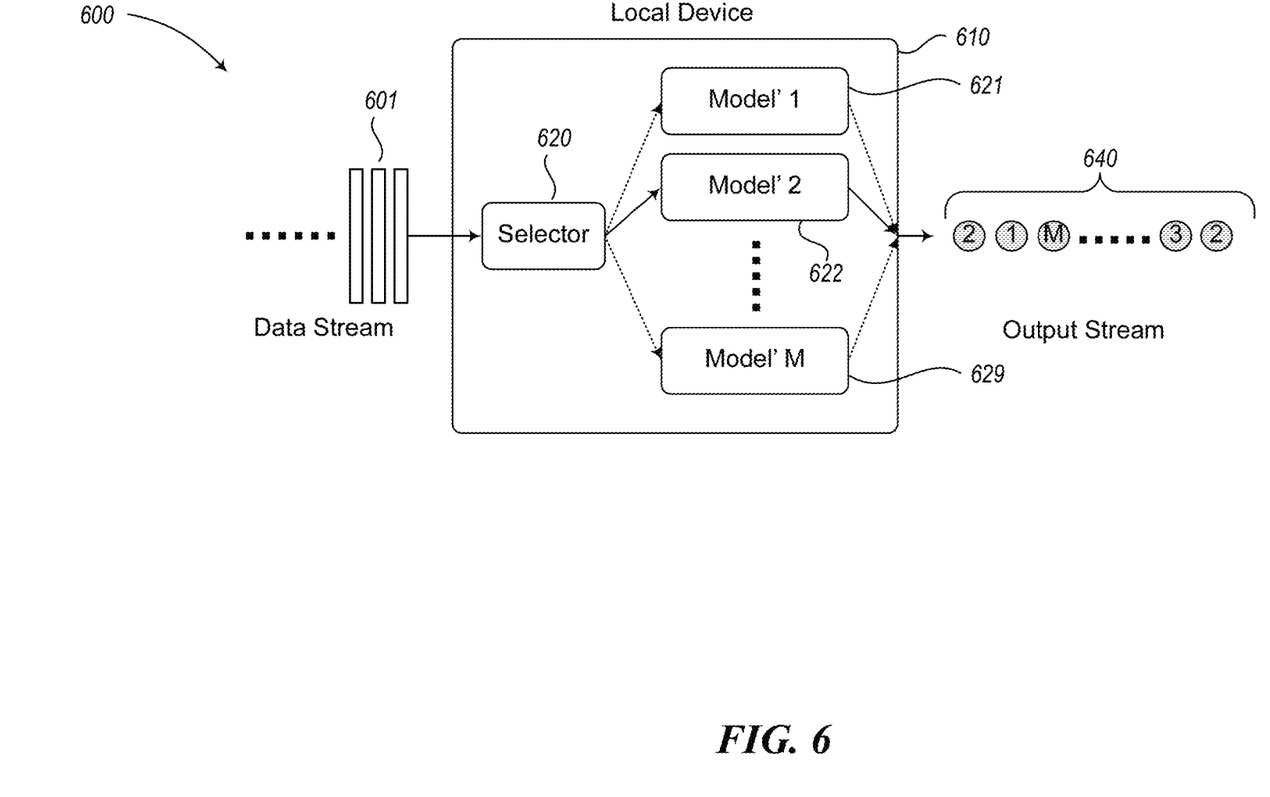
FIG. 6 is a data flow diagram that shows the facility's use of a round-robin approach to applying local models in the local inference process in some embodiments.

FIG. 6 is a data flow diagram that shows the facility's use of a round-robin approach to applying local models in the local inference process in some embodiments. The data flow 600 shows the data stream 601 of individual data items being received by a selector 620 on the local device 610. The selector chooses one of a number of heterogeneous models 621-629 for performing the facility's inference, and applies only that model to the present data item. For example, for a particular data item in the data stream, the facility may apply model' one 621, producing the circle in output stream 640 containing the number "1." For the next data item in the data stream, the selector may direct the data item constituent model' two 622 to produce an inference result for the data item, resulting in the circle containing the numeral "2" in the output stream. In some embodiments, the facility proceeds through each model in turn, returning to the first model each time all the models have been used. In some embodiments, the selector chooses a model randomly for each data item, or uses another approach to direct data items to constituent models. In the end, the output stream contains one inference result for each data item, produced by a single constituent model. Overall, inference results produced by different ones of the constituent models are contained in the output stream, and may be averaged or otherwise aggregated together by the facility in the output buffer. In some embodiments (not shown), the facility applies less than all the models to each data item, but more than one constituent model to each data item, such as two constituent models per data item, three constituent models per data item, etc., then averages or otherwise aggregates these multiple local inference results for the same data item to add to the output buffer as a single local inference result for the data item.

FIG. 7 is a flow diagram showing a process performed by the facility in a cloud server in some embodiments to perform cloud inference. In some embodiments, the process shown in FIG. 7 is performed on a cloud server or other server. In act 701, the facility receives a data item and its index from the local device. In act 702, the facility applies one or more cloud inference models to the data item received in act 701 to obtain a cloud inference result. Act 702 is discussed in greater detail below in connection with FIG. 8. In act 703, the facility transmits the cloud inference result obtained in act 702 along with the index to the local device. After act 703, the facility continues in act 701 to receive the next data item.

Figure 8:
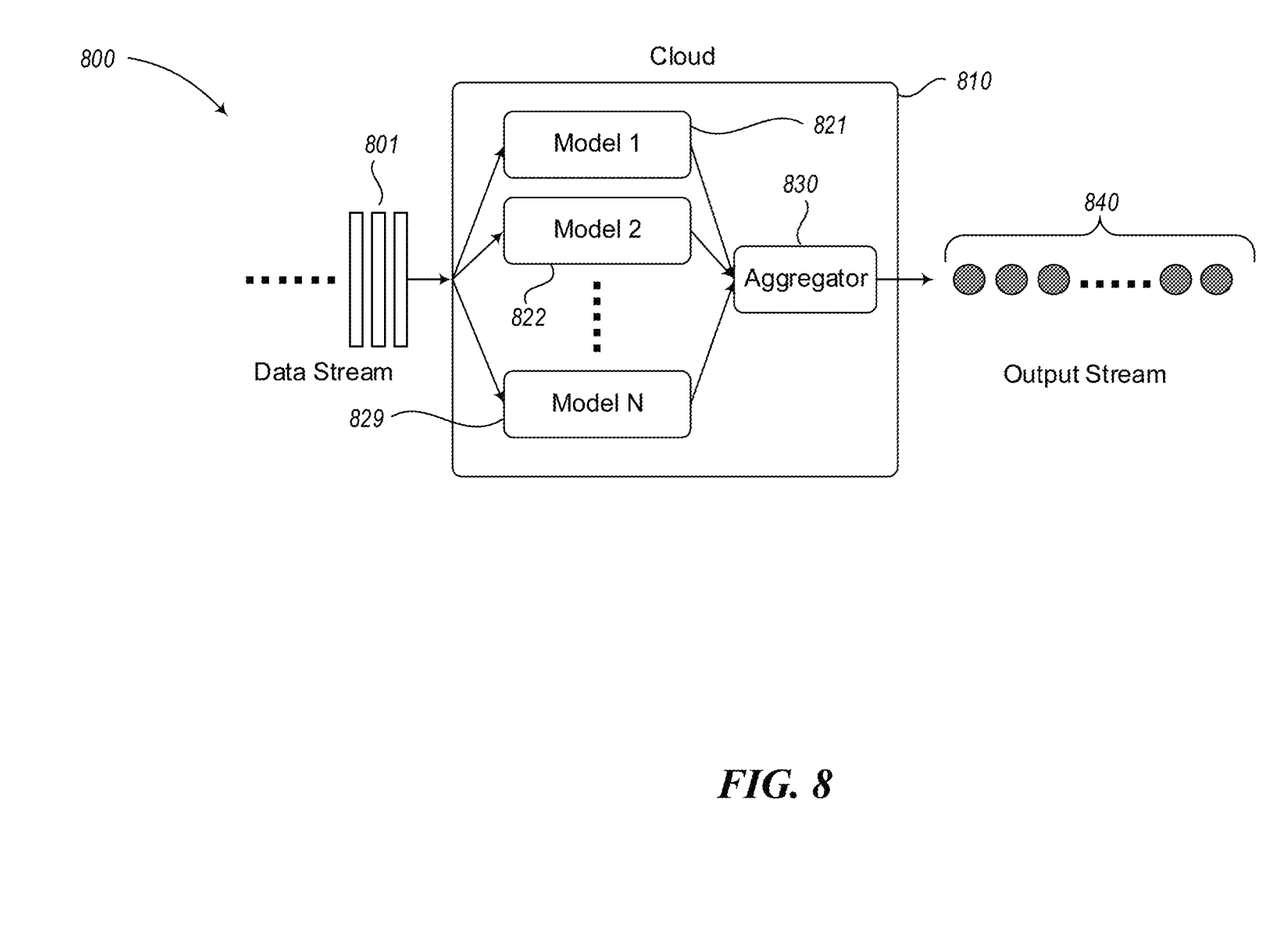
FIG. 8 is a data flow diagram showing a facility's performance of the cloud inference process in some embodiments.

FIG. 8 is a data flow diagram showing a facility's performance of the cloud inference process in some embodiments. It can be seen from the data flow 800 that each data item in the data stream received from the local device is routed to each of the constituent models in the ensemble, in other words, all of models 821-829. The inference results produced by these models are aggregated by the facility in an aggregator 830. In various embodiments, the aggregator uses a variety of aggregation functions to perform this aggregation operation. The results of this aggregation are returned to the local device as a sequence of cloud inference results 840.

Thus, in contrast to the single-constituent model local inference results shown in FIG. 6 that are added to the facility's output queue on the local device, the cloud inference results 840 returned by the cloud server to the local device and added to the output queue are each based on the application of all of the constituent models of the ensemble for each data item.

FIG. 9 is a flow diagram showing a process performed by the facility in some embodiments to receive cloud inference results and add them to the facility's output queue. In act 901, the facility receives cloud inference result from the cloud server, along with the index or other identifier of the data item from which the cloud server produced the cloud inference result. In act 902, the facility uses this index to substitute the cloud inference result received in act 901 for the local inference result contained in the output buffer for the same data item—that is, the local inference result in the output buffer that has the same index or identifier. After act 902, the facility continues in act 901 to receive the next cloud inference result. In some embodiments, the facility performs the receiving and substitution of multiple cloud inference results in parallel, rather than waiting to complete the insertion of one cloud inference result before receiving the next one (not shown).

FIG. 10 is a flow diagram showing a process performed by the facility in some embodiments to generate inference output based upon the contents of the facility's output buffer. In act 1001, the facility aggregates the inference results contained in the output buffer. As discussed above, in many cases, the inference results that are aggregated include some that were generated by the server, as well as some that were generated by the local device. In act 1002, the facility removes the oldest inference result from the output buffer. In act 1003, the facility performs any needed post-processing on the aggregated inference results produced in act 1001. In act 1004, the facility presents and/or acts on the inference results in their post-processed form. After act 1004, the facility continues in act 1001 to perform its next aggregation of the inference results in the output buffer.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
an ultrasound sensing device; and
a computing device, the computing device comprising:
   a communication interface configured to directly receive ultrasound echo data sensed by the ultrasound sensing device from a person, the received ultrasound echo data comprising a sequence of ultrasound images;
   a memory configured to:
      store a local machine learning model for producing inferences each in response to an ultrasound image in the sequence;
      store a queue holding inference results each corresponding to a different ultrasound image in the sequence;
   one or more processors configured to:
      for each ultrasound image of the sequence, in response to its receipt by the communications interface:
         attribute to the ultrasound image an identifier;
         dispatch the ultrasound image to a server;
         subject the ultrasound image to the local machine learning model to obtain a local inference result for the ultrasound image;
         add to the queue the obtained local inference result with the ultrasound image's identifier;
         aggregate the inference results contained by the queue to obtain an output inference result;
         remove the oldest inference result from the queue; and
         augment the ultrasound image with the visual information derived from the output inference result;
      receive from the server a plurality of cloud inference results each obtained by applying a server machine learning model to one of the ultrasound images dispatched to the server, each cloud inference result being accompanied by the identifier of the ultrasound image from which it was obtained;
      for each received cloud inference result, in response to its receipt, substitute the cloud inference result in the queue for the local inference result having the same identifier;
   a display device configured to:
      cause the augmented ultrasound images to be displayed.

2. The system of claim 1 wherein the ultrasound sensing device comprises a transducer.

3. The system of claim 1 wherein the server machine learning model is more complex than the local machine learning model.

4. The system of claim 1 wherein the server machine learning model requires greater computational resources to evaluate than the local machine learning model for a distinguished one of the ultrasound images of the sequence.

5. The system of claim 1 wherein the local machine learning model comprises a plurality of heterogeneous constituent machine learning models, the processor further configured to, for each ultrasound image of the sequence, in response to its receipt by the communications interface:

select a proper subset of the constituent machine learning models to use in applying the local machine learning model to the ultrasound image.

6. The system of claim 5 wherein the server machine learning model comprises the same plurality of heterogeneous constituent machine learning models as the local machine learning model,
and wherein all of the constituent models of the server machine learning model are applied to each ultrasound image.

7. The system of claim 5 wherein selection proceeds in accordance with a circular order of the constituent machine learning models.

8. The system of claim 5 wherein selection is random.

9. The system of claim 5 wherein selection selects a single constituent machine learning model.

10. The system of claim 1, the processor further configured to, for each ultrasound image of the sequence, in response to its receipt by the communications interface:
compress the ultrasound image, and wherein it is the compressed ultrasound image that is dispatched to the server.

11. The system of claim 10 wherein the compression is lossless.

12. The system of claim 10 wherein the compression is lossy.

13. The system of claim 1, the processor further configured to, for each ultrasound image of the sequence, in response to its receipt by the communications interface:
reduce the resolution of the ultrasound image, and wherein it is the reduced-resolution ultrasound image to which the local machine learning model is applied.

14. One or more instances of computer-readable media collectively having contents configured to cause a computing system to perform a method, the one or more instances of computer-readable media not constituting transitory signals per se, the method comprising:
receiving a sequence of data items;
for each data item, in response to its receipt:
forwarding the data item to a server;
subjecting the data item to a local machine learning model to produce a local inference result for the data item;
adding the produced local inference result to a queue;
aggregating the inference results contained by the queue to obtain an output inference result; and
removing the oldest inference result from the queue;
receiving from the server a plurality of cloud inference results each obtained by applying a server machine learning model to one of the data items forwarded to the server; and
for each received cloud inference result, in response to its receipt, substituting the cloud inference result in the queue for the local inference result for the same data item.

15. The one or more instances of computer-readable media of claim 14, the method further comprising:
assigning identifiers to each received data item to coordinate the substitution of cloud inference results for local inference results in the queue.

16. The one or more instances of computer-readable media of claim 14, the method further comprising:
for each data item, in response to its receipt:
storing the output inference result.

17. The one or more instances of computer-readable media of claim 14, the method further comprising:
for each data item, in response to its receipt:
causing the output inference result to be displayed.

18. The one or more instances of computer-readable media of claim 14 wherein each data item is an image, the method further comprising:
for each data item, in response to its receipt:
augmenting the data item's image in accordance with the output inference result; and
causing the augmented image to be displayed.

19. The one or more instances of computer-readable media of claim 14 wherein the server machine learning model is more complex than the local machine learning model.

20. The one or more instances of computer-readable media of claim 14 wherein the server machine learning model requires greater computational resources to evaluate than the local machine learning model for a distinguished one of the ultrasound images of the sequence.

21. The one or more instances of computer-readable media of claim 14 wherein the local machine learning model comprises a plurality of heterogeneous constituent machine learning models,
the method further comprising, for each data item the sequence, in response to its receipt:
selecting a proper subset of the constituent machine learning models to use in applying the local machine learning model to the data item.

22. The one or more instances of computer-readable media of claim 21 wherein the server machine learning model comprises the same plurality of heterogeneous constituent machine learning models as the local machine learning model,
and wherein all of the constituent models of the server machine learning model are applied to each ultrasound image.

23. The one or more instances of computer-readable media of claim 21 wherein selection proceeds in accordance with a circular order of the constituent machine learning models.

24. The one or more instances of computer-readable media of claim 21 wherein selection is random.

25. The one or more instances of computer-readable media of claim 21 wherein selection selects a single constituent machine learning model.

26. The one or more instances of computer-readable media of claim 14, the method further comprising, for each data item of the sequence, in response to its receipt:
compress the data item,
and wherein it is the compressed data item that is dispatched to the server.

27. The one or more instances of computer-readable media of claim 26 wherein the compression is lossless.

28. The one or more instances of computer-readable media of claim 26 wherein the compression is lossy.

29. The one or more instances of computer-readable media of claim 14, the method further comprising, for each data item of the sequence, in response to its receipt:
reducing the resolution of the data item,
and wherein it is the reduced-resolution data item to which the local machine learning model is applied.

30. A method in a computing system for configuring hybrid inference for sequence of data items generated by a local device, the method comprising:

installing on a cloud server:
  a cloud inference model, and
  server software adapted to:
    receive data items from the local device;
    subject the data items received from the local device to the cloud inference model to obtain a cloud inference result for each; and
    return the cloud inference results to the local device as they are obtained, and
installing on the local device:
  a local inference model that can be evaluated using lesser computational resources than are needed to evaluate the cloud inference model, and
  local software adapted to:
    access data items as they are generated by the local device;
    for each accessed data item:
      send the data item to the cloud server;
      subject the data item to the local inference model to obtain local inference result;
      store the local inference result in a circular buffer;
      aggregate the inference results contained by the circular buffer; and
    receive cloud inference results from the cloud server; and
    substitute in the circular buffer each received cloud inference result for the local inference result for the same data item.

\* \* \* \* \*